June 1, 1954  N. D. EAGON  2,679,991
CLOSURE FOR AIR DUCTS OF AIRCRAFT
Filed Nov. 15, 1951  3 Sheets-Sheet 1
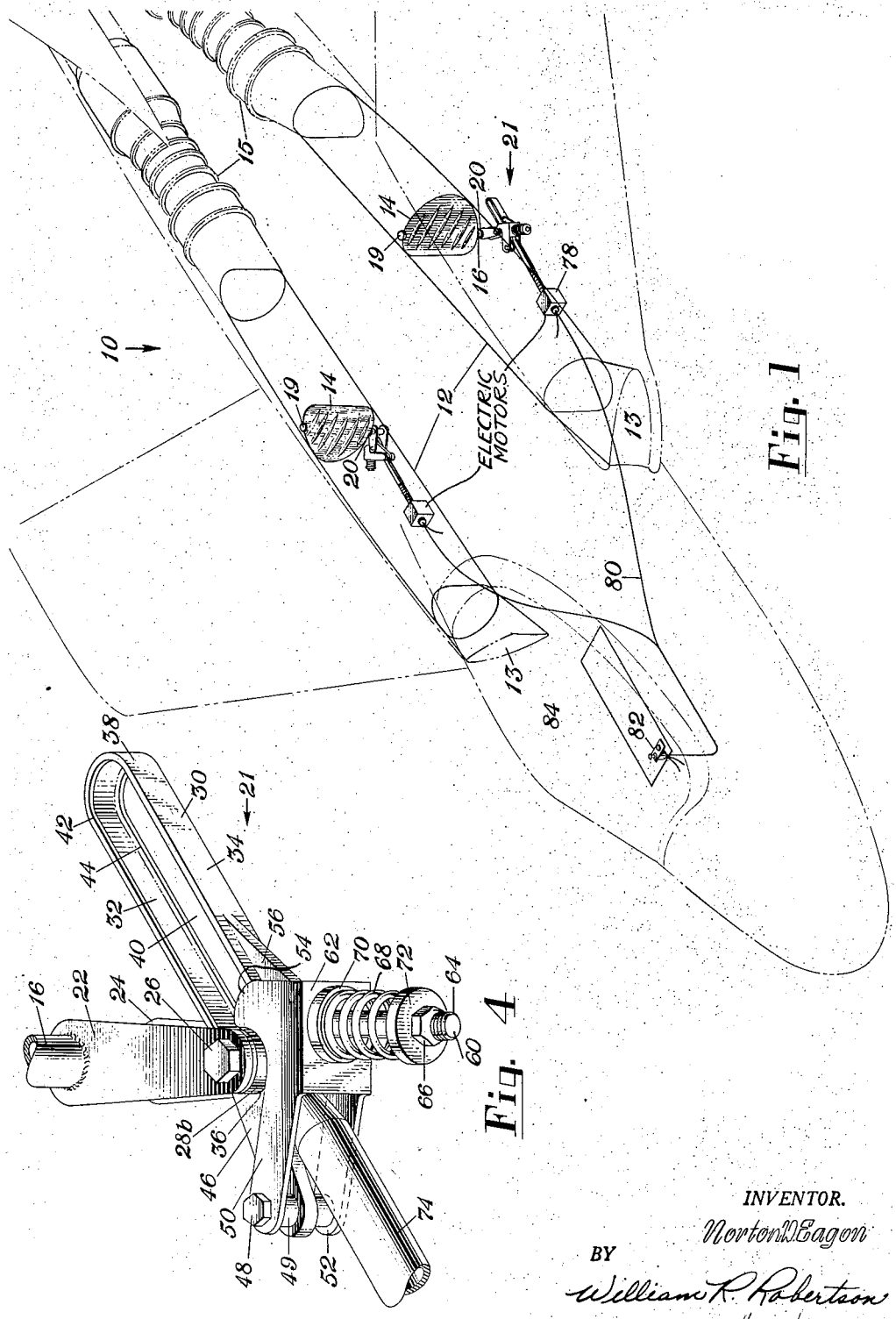
INVENTOR.
Norton D. Eagon
BY
William R. Robertson
Agent June 1, 1954     N. D. EAGON     2,679,991
CLOSURE FOR AIR DUCTS OF AIRCRAFT
Filed Nov. 15, 1951     3 Sheets-Sheet 2
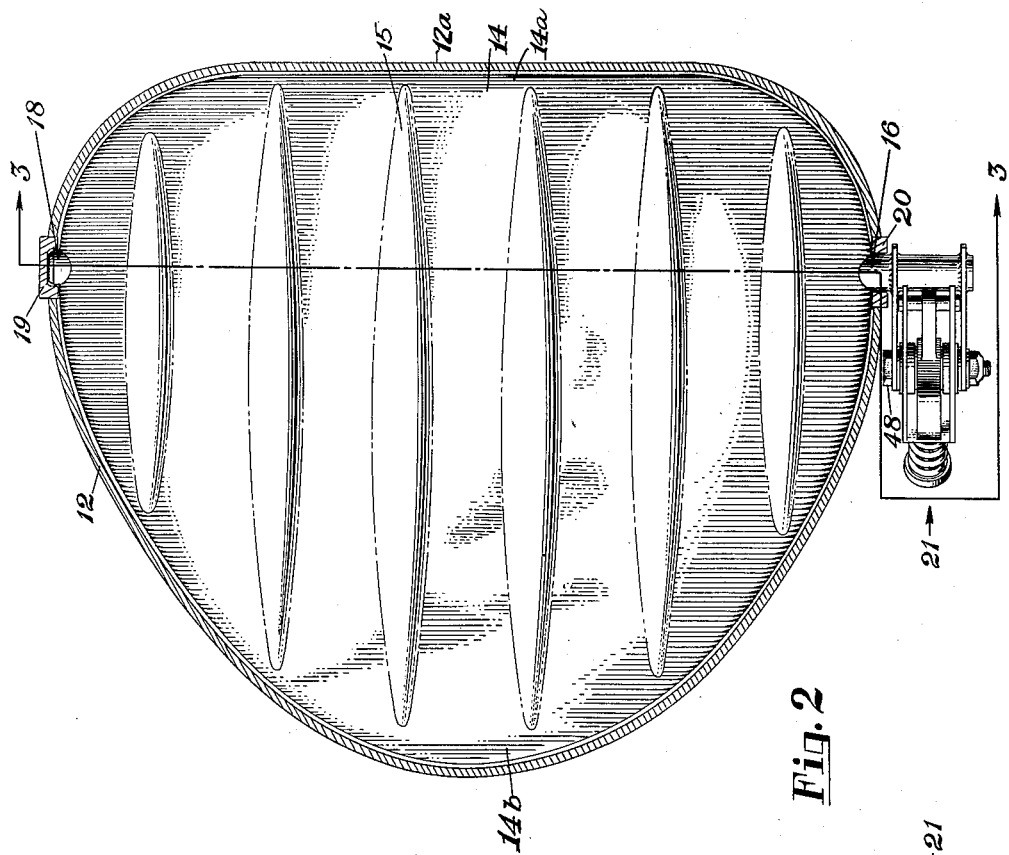
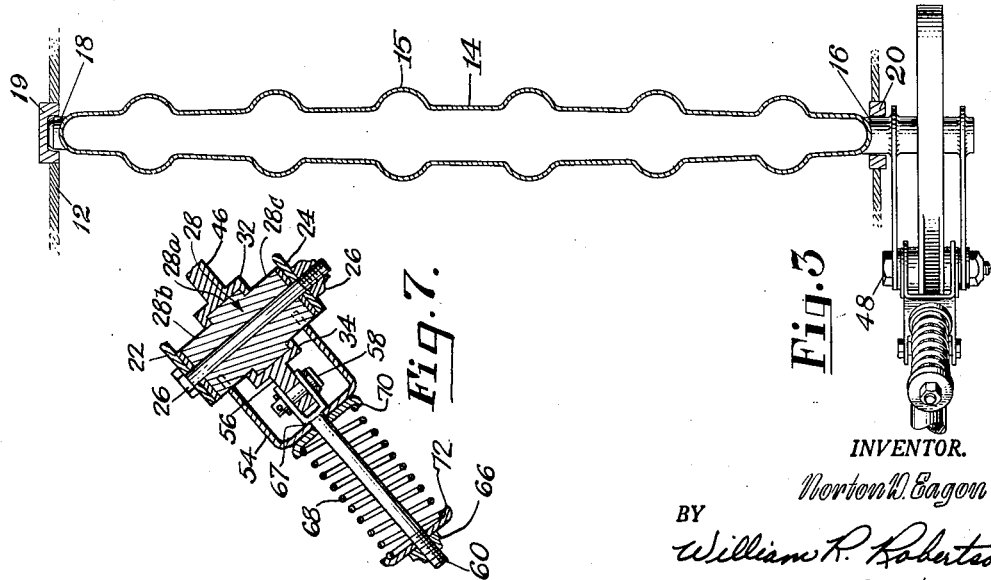
INVENTOR.
Norton D. Eagon
BY
William R. Robertson
Agent

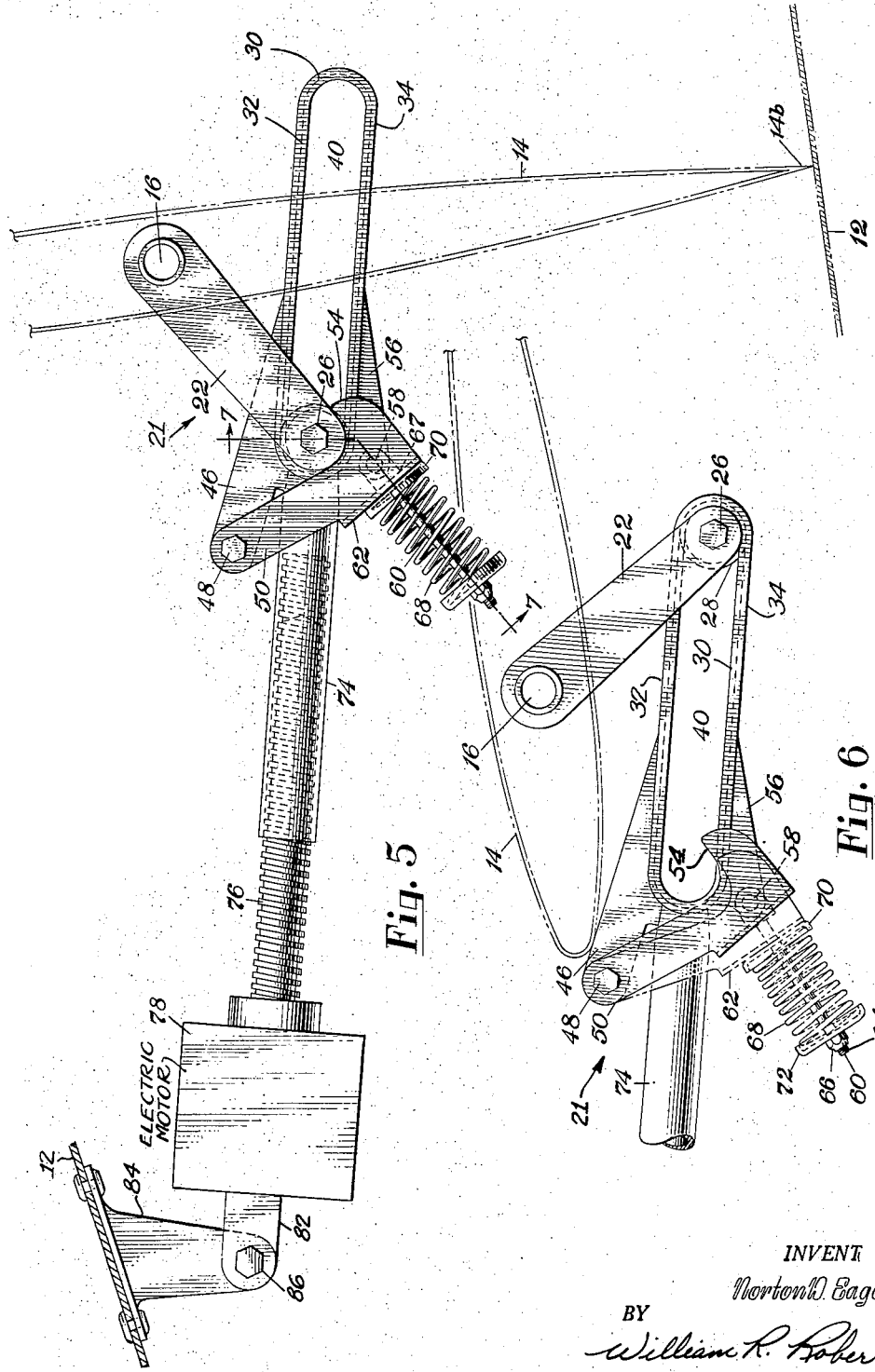

Patented June 1, 1954

2,679,991

UNITED STATES PATENT OFFICE 2,679,991

CLOSURE FOR AIR DUCTS OF AIRCRAFT

Norton D. Eagon, Grand Prairie, Tex., assignor, by mesne assignments, to Chance Vought Aircraft, Incorporated, a corporation of Delaware Application November 15, 1951, Serial No. 256,505

4 Claims. (Cl. 244—74)

This invention relates to duct closures and more particularly to closing doors for engine air intake ducts in jet-powered aircraft.

A jet-powered aircraft is capable of operating within its cruising range of speeds using much less power than that required for the take-off or for high speed flight. Therefore, in multi-engine jet-propelled aircraft it is possible to cruise long distances using only a partial number of the several jet engines of the aircraft. Utilizing this mode of operation where practical, a saving of fuel is effected and consequently, the flying range of the aircraft is increased.

When operating, jet engines require and use great quantities of air and, in order to supply that air to the engines, long tunnels or ducts having open forward ends located in the forward portion of the aircraft fuselage or wings are employed to convey ram air to the engines. An air duct is of considerable size and must remain open while the engine to which it is attached is in operation. The duct cannot be covered or provided with surface air baffles to make the aircraft aerodynamically "clean" because of its size and the fact that it must remain open while its engine is in operation.

It has been found that the amount of drag that an air duct and its opening contribute is great when the particular engine to which the air duct is connected is not in operation and in turbo-jet engines causes windmilling of the turbine and compressor rotors. This drag materially reduces the performance and cruising range of the aircraft. This invention provides a means for closing the inlet air duct to an engine not in operation and thus increasing the airplane's performance and conserving fuel. Another feature of the invention is a blow-open mechanism to be utilized in the event the usual air inlet door operating mechanism should fail.

An object of this invention is to provide an air duct closing door for an airplane that can be opened and closed at the will of the pilot.

Another object of this invention is to provide an operable closure for a jet engine air duct to prevent windmilling of the rotors of the engine when the engine is not in operation.

Yet another object of this invention is to provide a mechanism for opening and closing aircraft air ducts while in flight at the will of the pilot.

A further object of this invention is to provide a blow-open mechanism in connection with an air duct door operating mechanism.

Other objects and advantages will be apparent from the specification and claims, and from the accompanying drawings which illustrate an embodiment of the invention.

Figure 1, in the drawings, is a perspective view of a twin engine jet airplane showing the engine air ducts with the duct doors of the invention mounted therein;

Figure 2 is a rear elevational view of the duct door and operating mechanism of the invention with the door in a closed position;

Figure 3 is a side elevational view of the duct door and operating mechanism of the invention taken along line 3—3 of Figure 2;

Figure 4 is a perspective view of the duct door operating mechanism;

Figure 5 is a top plan view of the duct door operating mechanism with the door closed;

Figure 6 is a top plan view of the duct door similar to Figure 5, but with the blow-open mechanism in a released condition and the door open, the position of maximum travel of the locking hook and spring and eye bolt mechanism being denoted by broken lines, and Figure 7 is a cross-sectional view taken along line 7—7 of Figure 5 showing details of the eyebolt, the hook, the hook biasing means and the bearing and track member.

Referring now to Figure 1, an airplane is generally indicated at 10 in which air ducts 12 extend from its wing roots, where they have their forward inlets or openings 13, rearwardly within the fuselage to jet engines 15. In the midportion of the air ducts, approximately halfway between the inlet openings 13 and the engines 15, are air duct closures or doors 14. It is to be understood that a multi-engine airplane may have these duct doors installed in each air duct or only in the air ducts to the engine or engines to be consistently shut off when cruising. In the instant example as shown in Figure 1, having doors in both ducts, either engine could be shut off and benefit by the invention. Since both air duct doors and their operating mechanism are identical except for their right and left hand characteristics and inasmuch as they are operated separately and independently of each other, for clarity of description only, the port side door and its operating mechanism will be described.

The aerodynamic effect of locating the door at various points along the length of the duct is generally the same and therefore its actual location is a matter of design convenience. Static air pressure is created in the duct in front of the door when closed and this air pressure extends to the duct opening where it causes to be formed an aerodynamically suitable boundary layer which almost entirely eliminates the drag caused by the duct opening.

The door 14 is designed to fit snugly within the duct 12 and, as shown in Figures 1 and 2, its shape conforms to the inner periphery of the duct, having a flat portion 14a on its inboard edge to be in juxtaposition, in its closed position, to the flat portion 12a of the inboard edge of the duct 12; and having a curved outboard edge 14b to fit snugly in its closed position within the curved outboard portion of duct 12. It will be understood, of course, that different shapes of ducts and doors may be used as appropriate for particular installations. The door 14 being relatively thin has its surfaces ribbed or beaded with ribs 15 (Figures 2 and 3) for greater structural strength. Door 14 is rigidly secured at its lower edge to a shaft 16 which supports door 14 and about whose vertical axis door 14 rotates. To the top edge of the door a short shaft 18 having the same vertical axis as shaft 16 is rigidly secured as by welding. The common vertical axis of shafts 16 and 18 does not coincide with the geometrical vertical axis of door 14, but rather is located on the inboard side of the geometrical axis. Shaft 18 is designed to fit in a journal box 19 carried in the top of the air duct 12, being rotatable therein and acting as the upper support for door 14. Shaft 16 extends through an annular bushing 20, located in the lower portion of duct 12 directly below the recess in which shaft 18 fits. The lower end of shaft 16 is engaged by mechanism 21.

Referring now to Figure 4, rigidly secured to shaft 16 as by welding below bushing 20 are the inboard ends of two parallel arms 22 and 24. The arms 22 and 24 are horizontal and spaced apart and their outboard ends are rigidly secured to a shaft 26 extending through a bearing 28 carried on shaft 26 between the ends of arms 22 and 24. A central portion 28a of bearing member 28 (Figure 7) is positioned within and rides in enclosed track member 30 but the upper portion 28b and the lower portion 28c of bearing member 28 on either side of the central portion 28a extend, respectively, above and below track member 30. Arms 22 and 24, respectively, extend above and below member 30. Member 30 is elongated, having two straight sides 32 and 34 and two semicircular end portions 36 and 38 encompassing a slot 40 which extends completely through member 30. Around the upper and lower edges of member 30 are flanges 42 and 44 respectively which extend horizontally into the slotted portion 40 and act as retaining guides for the central portion 28a of bearing member 28.

Member 30 has a horizontal flange 46 extending in an inboard and forward direction from side 32. Flange 46 has an aperture in its forward end portion through which a shaft 48 is freely positioned. To the ends of shaft 48 are rigidly secured the ends of two arms 50 and 52 of a channel type hook 54 and arms 50 and 52 are spaced from flange 46 by spacers 49. Hook 54, being rigidly secured to shaft 48, is free to pivot about the axis of shaft 48.

Member 30 has another horizontal flange 56 extending in an outboard and forward direction from side 34. Pivotally secured to the end of flange 56 by a bolt 58 (as seen in Figure 7) is a clevis end of eye bolt 60 the shank of which extends through a flat portion 62 (Figure 6) of hook 54 and terminates in a threaded portion 64 on which a nut 66 is threaded. The flat portion 62 of hook 54 is normally kept in contact with shoulders 67 of the clevis end of eye bolt 60 by a preloaded compression spring 68 and two retaining washers 70 and 72 through which bolt 60 is positioned, the spring 68 and washers 70 and 72 being retained on bolt 60 by the nut 66. Spring 68 urges hook 54 to remain in a closed position bearing against the upper and lower portions 28b and 28c of bearing member 28 and thereby clamping the central portion 28a of bearing member 28 against the end 36 of member 30 as illustrated in Figure 4.

Member 30 is rigidly secured at its end portion 36, as by welding, to an internally threaded sleeve 74. The internal threads of sleeve 74 mesh with the threads of a jack screw 76. The turning of screw 76 within sleeve 74 causes sleeve 74 to move forward or aft along the longitudinal axis of screw 76 depending on the direction of rotation of screw 76. Screw 76 is secured to gearing of electric motor 78 which has built-in gearing and limit switches (not shown) so that when the sleeve travels a predetermined distance the motor will shut off. Motivating power is transmitted to motor 78 by electrical circuit 80 which is controlled by a two way switch 82 located in the cockpit 84 of airplane 10. Secured to the housing of motor 78 at the end opposite to the screw jack 76 is a pair of lugs 82 which have a pivotal attachment by a bolt 86 to a lug 84 which is mounted on the wall of air duct 12. This arrangement permits nutational movement of the motor about the axis of bolt 86 required during the arcuate swinging of arms 22 and 24 when opening and closing the doors 14. It is of course to be understood that in place of the jack screw-sleeve-electric motor actuating mechanism used for illustration, suitable hydraulic strut or manual mechanical linkage arrangements can equally well be utilized to actuate the mechanism for door movement.

Motor 78 is secured to aircraft structure as described above and as motor 78 causes screw 76 to turn in a counterclockwise direction (looking to the right in Figure 5), sleeve 74 is caused to move forward (to the left) along screw 76. As sleeve 74 moves forward it carries with it member 30 which is rigidly secured thereto. Bearing member 28 and shaft 26 are retained in the end portion 36 of slot 40 by hook 54 and therefore, as member 30 moves forward, shaft 26 and the pivotally secured outboard ends of arms 22 and 24 move forward. Inasmuch as the other ends of arms 22 and 24 are rigidly secured to shaft 16, shaft 16 is caused to turn in a clockwise direction (Figure 4) thereby causing the door 14 which is rigidly secured thereto to turn in a clockwise direction. When sleeve 74 reaches the limit of its forward travel on screw 76 and motor 78 cuts off, door 14 is in a position perpendicular to the surfaces of duct 12 thereby closing duct 12 as shown in Figures 2 and 5.

Likewise, as motor 78 turns screw 76 clockwise, (looking toward the right in Figure 5) sleeve 74 causes member 30 to move aft. Arms 22 and 24 rotate about the axis of shaft 16 thereby turning shaft 16 and door 14 in a counter-clockwise direction opening air duct 12. This permits air to flow through the duct to the engine and allow engine operation.

Should the door 14 and the operating mechanism 21 be in the closed position illustrated in Figure 5 and the actuating mechanism fail to function to open the door, the pilot, in order to open the door, could exceed cruising speed by putting the airplane into a diving attitude. This increased speed would be sufficient to increase the air forces on the air duct door to the extent that the door tends to rotate in a counter-clockwise direction. These forces, relayed through shaft 16, arms 22 and 24 to shaft 26, would cause bearing member 28 on shaft 26 to be forced against hook 54 causing spring 68 to be compressed to the extent that bearing 28 is permitted to slide out of engagement with hook 54, during which disengagement the hook 54, bolt 60 and spring 68 will temporarily recede to the dotted line position shown in Figure 6. Sliding out of engagement with hook 54, the bearing 28 would ride along slot 40 to end portion 38 of track member 30 due to the increased air load in the air duct acting on the door 14 and shaft 16 which causes them to rotate and thereby open the duct 12. The air load will of course cause the door to be retained in the open position. The blow-open characteristic of this device just described depends upon the strength of compression spring 68 which is determined for particular applications by the size of the air duct closing door and the cruising speed of the aircraft.

After the door has been blown open and disengaged from the hook, as described above, the mechanism may be re-set as follows. The motor 78 is activated by the pilot to turn screw 76 clockwise thus driving sleeve 74 and member 30 aft (to the right in Fig. 6) until the arcuate outer portion of the nose of hook 54 abuts bearing member 28. It will be understood that the pressure of hook 54 against bearing member 28 will rotate arms 22 and 24 and door 14 in a counter-clockwise direction (Figure 6) until the edge 14b of door 14 abuts the inboard wall 12a of duct 12 under which condition further aft (to the right) movement of arms 22 and 24 and bearing member 28 will be prevented. Thus further movement to the right of sleeve 74 and member 30 will serve to compress spring 68 while the nose of hook 54 rides over the periphery of portions 28b and 28c of bearing member 28 until it gets over their greatest diameter at which point the hook 54, eye-bolt 60 and spring 68 will have receded to the position shown in phantom lines in Fig. 6. When the nose of hook 54 passes over the greatest diameter of portions 28b and 28c of bearing member 28, the inner surface of the hook 54 slides over the right hand side of portions 28b and 28c of bearing member 28 under the load of spring 68, hook 54 assuming its biased position whereby the central portion 28a of bearing member 28 is engaged at the end portion 36 of track member 30 by pressure of the hook 54 against portions 28b and 28c of bearing member 28 as shown in Fig. 5. The mechanism being thus engaged, the door can again be rotated through driving of sleeve 74 by motor 78 and screw 76.

It is thus seen that a mechanism has been provided for opening and closing the inlet air ducts of an airplane at the will of the pilot and also a means has been provided in that mechanism for opening the air ducts should the opening mechanism fail to operate at a time when the duct is closed. The mechanism thus provided comprises a power transmission device for operating the closures of air ducts in aircraft wherein the enclosed track member 30 constitutes a push-pull input member having an elongated opening and the parallel arms 22 and 24 constitutes a crank output member.

While only one embodiment of the invention has been shown in the accompanying drawings, it will be evident that various modifications are possible in the arrangement and construction of the air duct closure mechanism's components without departing from the scope of the invention.

What it is desired to be secured by Letters Patent is:

1. A mechanism for operating a closure in an aircraft jet engine air duct leading from a forward portion of said aircraft to said engine and having an entrance for receiving ram air pressure from the atmosphere wherein said closure is pivotally mounted in said duct spaced from said entrance comprising: a source of power, a member having an elongated slotted portion, means for transmitting power from said source of power to said member, a bearing member riding in the slotted portion of said slotted member and operatively connected to said closure whereby movement of said bearing member causes movement of said closure in relation to said duct, and biasing means for retaining said bearing member in a fixed position in relation to said slotted member whereby movement of said slotted member by said source of power will cause movement of said bearing member, and means responsive to ram air pressure in said duct between said closure and said entrance above a predetermined magnitude for overriding said biasing means whereby said bearing member moves in relation to said slotted member for moving said closure to permit the passage of air through said duct.

2. A mechanism for operating a closure in an aircraft jet engine air duct having an entrance for receiving ram air pressure from the atmosphere said closure being pivotally mounted in said duct rearwardly of said entrance comprising: a source of power, a crank operatively connected to said closure whereby movement of said crank will pivot said closure, a member having a pivotal connection with said crank, means for transmitting power from said power source to said member for moving said member, means for normally retaining said pivotal connection whereby movement of said member will cause movement of said crank, and means responsive to ram air pressure in said duct between said entrance of said closure above a predetermined amount for rendering said retaining means ineffective and for moving said crank independently of said member.

3. A mechanism according to claim 2 wherein the means for normally retaining said crank in a fixed relation to said member comprises a spring-loaded hook pivotally connected to said member and engaging said crank at said pivotal connection.

4. A mechanism for operating a closure in a jet engine air duct said duct having an entrance for receiving ram air pressure from the atmosphere wherein said closure is pivotally mounted in said duct rearwardly of said entrance comprising: a source of power, a first member operatively connected to said closure whereby movement of said first member by said source of power will pivot said closure, a second member having an enclosed track portion in which said first member rides, means for transmitting power from said power source to said second member for moving said second member, means for normally retaining said first member in an operative relation to said second member within the enclosed track portion of said second member whereby movement of said second member will cause movement of said first member, and means responsive to ram air pressure in said duct forwardly of said closure above a predetermined amount for rendering said retaining means ineffective and for moving said first member independently of said second member.

References Cited in the file of this patent

UNITED STATES PATENTS

| Number | Name | Date |
|---|---|---|
| 1,564,261 | Mathieson et al. | Dec. 8, 1925 |
| 1,579,324 | Josephs | Apr. 6, 1926 |
| 1,628,506 | Lyman | May 10, 1927 |
| 1,820,686 | Wise | Aug. 25, 1931 |
| 2,212,252 | Srodulski | Aug. 20, 1940 |
| 2,280,835 | Lysholm | Apr. 28, 1942 |
| 2,428,708 | Heftler | Oct. 7, 1947 |
| 2,499,256 | Payne | Feb. 28, 1950 |
| 2,529,973 | Sédille | Nov. 14, 1950 |
| 2,575,086 | Atchison | Nov. 13, 1951 |

FOREIGN PATENTS

| Number | Country | Date |
|---|---|---|
| 50,033 | France | Aug. 1, 1939 |
| | (3rd addition to No. 779,655) | |